(No Model.)

W. B. ALLEN.
POWDER DUSTER.

No. 277,655. Patented May 15, 1883.

Witnesses.
O. P. Judd.
A. L. White

Inventor.
W. B. Allen
by Mighty & Brown
Attys

UNITED STATES PATENT OFFICE.

WALTER B. ALLEN, OF ANDOVER, MASSACHUSETTS.

POWDER-DUSTER.

SPECIFICATION forming part of Letters Patent No. 277,655, dated May 15, 1883.

Application filed August 25, 1882. (No model.)

*To all whom it may concern:*

Be it known that I, WALTER B. ALLEN, of Andover, in the county of Essex and State of Massachusetts, have invented certain Improvements in Insect-Poison Distributers, of which the following is a specification.

This invention has for its object to provide an attachment for an ordinary wheelbarrow, whereby a man by wheeling the barrow between rows of potato-vines can distribute insect-destroying powder thoroughly and rapidly upon the vines.

The invention consists in a cylinder or poison-holder adapted for attachment to the side of a wheelbarrow, and provided with a rotary arbor having an agitator within the cylinder and a pulley adapted to be belted to a pulley on the axle of the supporting-wheel, said cylinder being perforated in its lower portion, so that when the agitator is rotated in it by the movement of the wheelbarrow the insect-killing powder will be forced out and fall upon the vines, as I will now proceed to describe.

Figure 1:
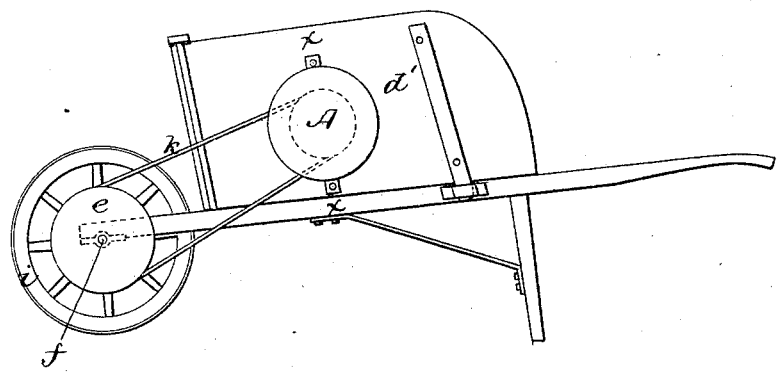
Figure 2:
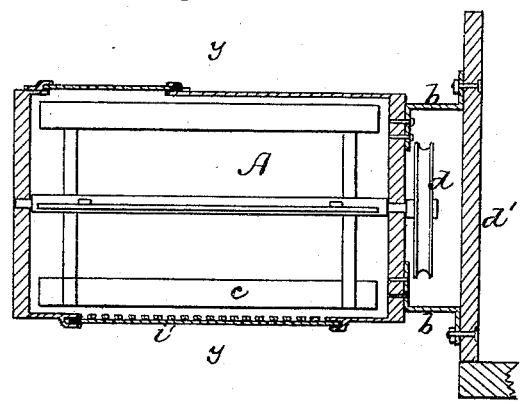
Figure 3:
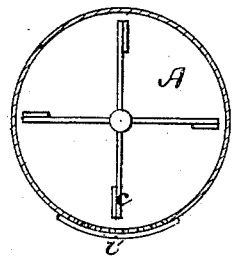

Of the accompanying drawings, forming a part of this specification, Figure 1 represents a side view of a wheelbarrow provided with my improvements. Fig. 3 represents a vertical section on line $x$ $x$, Fig. 1. Fig. 3 represents a section on line $y$ $y$, Fig. 2.

The same letters of reference indicate the same parts in all the figures.

In the drawings, A represents a cylinder, preferably about eight inches in diameter and sixteen inches in length, and provided at one end with suitable lugs or arms, $b$, adapted to be bolted to the side $d'$ of the wheelbarrow. In the cylinder is journaled a rotary agitator, $c$, the shaft or arbor of which is provided at one end of the cylinder with a pulley, $d$.

$e$ represents a pulley rigidly attached in any suitable manner to the axle $f$ of the supporting-wheel $i$, and connected by a belt, $k$, with the pulley $e$, so that when the wheelbarrow is propelled the agitator will be rotated in the cylinder. The lower portion of the cylinder is perforated, and the rotation of the agitator forces the insect-destroying powder with which the cylinder is supplied through the perforations onto the vines or plants, over which the cylinder projects, the wheelbarrow being beside the row of vines or plants. The cylinder is preferably provided with a slide, $i'$, adapted to cover the whole or any desired parts of the perforated portion, so as to prevent or regulate the discharge of the powder. The powder is supplied to the cylinder through a suitable opening, preferably in the top thereof, said opening having a cover, $y$.

It will be seen that by my improvement an efficient machine is readily produced at a nominal expense, the wheelbarrow furnishing the motive power of the agitator and a support for the cylinder or holder, and being readily adapted to the desired purpose. The weight of the cylinder may be counterbalanced by a vessel containing a supply of the powder placed in the wheelbarrow.

The agitator is preferably composed of suitable arms or blades attached to the arbor on which the pulley is located.

I claim—

1. The combination, with a wheelbarrow or vehicle having a single central wheel, $c$, and a body with propelling-handles behind said wheel, whereby the barrow or vehicle is adapted to be propelled by a person walking behind, of a pulley, $e$, attached to the axle of wheel $c$, a powder-holding vessel attached to one side of the barrow or vehicle, so as to project over a row of plants beside which the vehicle is wheeled, and an agitator operated by a connection with said pulley $e$ to discharge powder from the vessel upon the plants, the body of the vehicle being adapted to contain a supply of the powder, serving both to replenish the holder A and as a counterbalancing-weight for the latter, as set forth.

2. The combination of a wheelbarrow or vehicle having a single central wheel, $c$, and a body with propelling-handles behind the wheel, a pulley attached to the axle of the wheel $c$, a powder-holding vessel, A, attached to one of the side pieces, $d'$, and an agitator journaled in said vessel and provided on its arbor with a pulley, $d$, and a belt, $k$, connecting the pulleys $e$ $d$, as set forth.

3. The vessel or holder A, having a perforated lower portion, and provided with a rotary agitator having a pulley, $d$, on its arbor, outside of the vessel, and with brackets or attaching devices $b$, whereby said vessel is adapted for attachment to one of the vertical sides of a wheelbarrow, as set forth.

In testimony whereof I have signed my name to this specification, in the presence of two subscribing witnesses, this 21st day of August, 1882.

WALTER B. ALLEN.

Witnesses:
C. F. BROWN,
A. L. WHITE.